United States Patent [19]

Yokoi et al.

[11] Patent Number: 5,898,015
[45] Date of Patent: Apr. 27, 1999

[54] MATERIAL FOR ABSORBING NITROGEN OXIDES COMPRISING HOLLANDITE-TYPE COMPLEX OXIDE

[75] Inventors: Hitoshi Yokoi, Aichi-ken; Yasuyuki Okimura, Konan; Tadashi Hattori, Nagoya, all of Japan

[73] Assignee: NGK Spark Plug Co., Ltd., Aichi-ken, Japan

[21] Appl. No.: 08/707,488

[22] Filed: Sep. 19, 1996

[30] Foreign Application Priority Data

Sep. 19, 1995 [JP] Japan ..................... 7-240281
Sep. 19, 1995 [JP] Japan ..................... 7-240284

[51] Int. Cl.$^6$ ................. B01J 20/00; B01J 23/02
[52] U.S. Cl. ............... 502/414; 502/400; 502/342; 502/343; 502/344; 502/352; 502/355; 423/213.2; 423/239.1
[58] Field of Search .................... 502/317, 322, 502/328, 329, 414, 310, 341, 400, 342, 343, 344, 352, 355; 423/213.2, 239.1

[56] References Cited

U.S. PATENT DOCUMENTS 3,929,670  12/1975  Kudo et al. ..................... 502/244

FOREIGN PATENT DOCUMENTS 5-317652  12/1993  Japan ..................... B01D 53/63
6-142458   5/1994  Japan ..................... B01D 53/36
7-116515   5/1995  Japan ..................... B01J 23/08
7-136519   5/1995  Japan ..................... B01J 27/186
7-171349   7/1995  Japan ..................... B01D 53/94

OTHER PUBLICATIONS

Proceedings of International Symposium on Environmental Issues off Ceramics, Selective Reduction of Nitrogen Monoxide by Hollandite type Compounds, by, M. Watanabe et al., Oct., 1994.

*Primary Examiner*—Glenn Caldarola
*Assistant Examiner*—In Suk Bullock
*Attorney, Agent, or Firm*—Sughrue, Mion, Zinn, Macpeak & Seas, PLLC

[57] ABSTRACT

A nitrogen oxide absorbing material, comprising a hollandite-type complex oxide having main metal elements comprising minimally of aluminum and tin, or zinc and tin, and a method of using that nitrogen oxide absorbing material comprising the steps of contacting the nitrogen oxide absorbing material with a gas containing nitrogen oxides. The method of reducing the adsorbed nitrogen oxides on the nitrogen oxide absorbing material includes the steps of releasing the nitrogen oxides from the nitrogen oxide absorbing material, and of reducing the released nitrogen oxides with a three way catalyst or other nitrogen oxide reducing catalysts.

7 Claims, 3 Drawing Sheets

MATERIAL FOR ABSORBING NITROGEN OXIDES COMPRISING HOLLANDITE-TYPE COMPLEX OXIDE

FIELD OF THE INVENTION

This invention relates to a novel material for absorbing nitrogen oxides and a nitrogen oxide removing method using the material.

BACKGROUND OF THE INVENTION

The development of a method for decomposing or removing nitrogen oxides or other harmful pollutants in the exhaust gas from automotive vehicles has been increasingly demanded due to environmental pollution. A three way catalytic converter, for removing carbon monoxide, hydrocarbons and nitrogen oxides concurrently, is a practical catalyst for purification of the exhaust gas. Cordierite coated with gamma-alumina or other heat resistant carrier supporting Pd, Pt, Rh or other noble metal is for general use.

However, in a lean-burn engine and a diesel engine, which are operated under the condition of high oxygen concentration the three way catalytic converter is ineffective because the noble metals are poisoned with excess oxygen. Although zeolites have been studied as the catalyst serving under the condition of high oxygen concentration, their structures easily break under the hydrothermal conditions. Oxide catalysts superior in heat resistance have also been studied, however, they are insufficient in catalytic activity for their practical use.

On the other hand, in thermal power plants or other fixed combustion equipments, nitrogen oxides in the exhaust gas containing excess oxygen are reduced by the oxide catalyst with ammonia as a reductant. Because ammonia has toxicity, a safety problem is created when this system is utilized for automotive vehicles or other moving combustion equipments or the fixed combustion equipments installed in an urban area.

Recently, a method of removing nitrogen oxides in the exhaust gas containing excess oxygen was developed. In the method, nitrogen oxides are absorbed by an absorbent in the lean-burn region or in the presence of excess oxygen, and nitrogen oxides are desorbed and reduced by means of the three way catalyst in the rich-burn region or in the vicinity of the stoichiometric air/fuel ratio.

Known absorbents of nitrogen oxides are complex oxides of the Ba—Cu—O system and the Mn—Zr—O system. However, a material having better and stable absorbability even at high temperatures is demanded.

SUMMARY OF THE INVENTION

Wherefore, an object of the present invention is to provide a nitrogen oxide absorbing material for temporarily absorbing nitrogen oxides in the exhaust gas of high oxygen concentration from a diesel engine or others, and for removing nitrogen oxides emitted into the atmospheric air.

Another object is to provide a nitrogen oxide removing device using the nitrogen oxide absorbing material.

To attain these objects, the present invention provides a nitrogen oxide absorbing material composed of a hollandite-type complex oxide having main metal elements consisting minimally of aluminum (Al) and tin (Sn).

The complex oxide is represented by $A_Y Al_X Sn_{8-X} O_{16}$, in which A indicates an alkaline metal element or an alkaline earth metal element.

Specifically, the alkaline metal element or the alkaline earth metal element includes lithium(Li), sodium(Na), potassium(K), rubidium(Rb), cesium(Cs), calcium(Ca), strontium(Sr) and barium(Ba). Especially, when either metal element of K, Rb, Cs, Ca, Sr or Ba is used, its hollandite-type crystal structure is preferably stable.

The present invention also provides a nitrogen oxide processing device using the aforementioned nitrogen oxide absorbing material partially or completely.

Specifically, a device for purifying the exhaust gas from various automotive vehicles or others is provided. In the device, the nitrogen oxide absorbing material for use is powdered, grained, pelletized, or otherwise processed, or compacted in a honeycomb or other configurations.

The inventors of the present invention, as a result of their diligent studies, found that the complex oxide having a hollandite-type crystal structure with Al and Sn as main metals provides a high nitrogen oxide absorbing action even at high oxygen concentrations, and have reached the present invention.

The hollandite-type complex oxide is generally represented by a formula $A_Y B_X C_{8-X} O_{16}$, in which A indicates an alkaline metal element or an alkaline earth metal element, B indicates a divalent or trivalent metal element, and C indicates a tetravalent metal element. The metal element B substitutes for a part of the metal element C. The metal elements B and C form a tunnel structure together with oxygen, and the metal element A is present in the tunnel.

The nitrogen oxide absorbing material according to the present invention has a hollandite-type crystal structure with Al and Sn as the main metal elements disposed in the sites B and C. (The sites B and C are equal from the viewpoint of crystal chemistry.) When the main metal elements consist of Al and Sn, its general formula is $A_Y Al_X Sn_{8-X} O_{16}$, in which A indicates an alkaline metal element or an alkaline earth metal element. The ranges of X and Y are not limited, and are preferably between 0.5 and 2.5, for the stable hollandite structure. Out of this range, the stability of the hollandite structure will be impaired, because of a difference in the sizes of Al ion and Sn ion.

The X-ray powder diffraction pattern is illustrated in FIG. 1, where the alkaline metal element is potassium and the values of both X and Y are 1.8.

When the complex oxide having the aforementioned structure is placed in contact with, for example, the exhaust gas containing nitrogen oxides, it can absorb nitrogen oxides ($NO_X$) contained in the exhaust gas. Specifically, nitrogen oxides can be absorbed on the hollandite-type complex oxide containing the main metal elements of Al and Sn, which are placed in contact with the exhaust gas containing nitrogen oxides.

The absorption mechanism is only insufficiently clarified. On the surface of the complex oxide according to the present invention, NO is oxidized via $NO_2$ to a nitrate anion or a nitrite anion and taken into a bulk.

In a method of manufacturing the nitrogen oxide absorbing material according to the present invention, for example, alkoxides or other organic metal compounds of the alkaline metal element or the alkaline earth metal element, and the main metal elements of Al and Sn, and/or nitrates or other inorganic metal compounds of the main metal elements of Al and Sn are dissolved in alcohol or other solvents. Subsequently, after the hydrolysis is executed as required, the evaporation to dryness follows. Resulting residuum is thermally treated at a temperature not lower than 600° C. The temperature for thermal treatment is preferably between 800° C. and 1200° C. Consequently, the hollandite-type complex oxide having a large specific surface area and good crystallinity is sufficiently prepared without decomposition.

Alternatively, to manufacture the nitrogen oxide absorbing material, after the fine tin oxide, $SnO_2$ is uniformly suspended in alcohol, the alkoxides of Al and an alkaline metal element or an alkaline earth element are dissolved in the suspension, hydrolyzed, and thermally treated for synthesis.

Although the method of manufacturing the nitrogen oxide absorbing material is not limited, it is difficult to synthesize the complex oxide of the present invention through solid phase reactions from the oxides, carbonates or others of the component elements, because Al is far different from Sn in ionic radius: $Al^{3+}/Sn^{4+}=0.77$.

In the present invention the nitrogen oxide processing device is constituted partially or overall by the aforementioned nitrogen oxide absorbing material having a function of absorbing nitrogen oxides. For example, automotive exhaust gas or other is introduced in the nitrogen oxide processing device, and nitrogen oxides in the exhaust gas are absorbed on the nitrogen oxide absorbing material, such that the exhaust gas can be effectively purified.

Specifically, in the nitrogen oxide processing device, for example, in the burning region with lean fuel (that is, excess oxygen) nitrogen oxides are absorbed on the nitrogen oxide absorbing material, and in the burning region with rich fuel and in the vicinity of stoichiometric air/fuel ratio, nitrogen oxides are desorbed, and reduced by means of the three way catalytic converter.

The nitrogen oxide absorbing material for use in the present invention is superior in the absorption of nitrogen oxides at high temperatures, and, therefore, is advantageously used for treating the high temperature exhaust gas from an automotive vehicles or others.

The present invention further provides a nitrogen oxide absorbing material composed of a hollandite-type complex oxide containing the main metal elements consisting of at least Zn and Sn.

The inventors of the present invention, as a result of their diligent studies, also found that a hollandite-type crystal structure complex oxide containing Zn and Sn provides a high nitrogen oxide absorbing action even at high temperatures, and have reached the present invention.

Another nitrogen oxide absorbing material according to the present invention is a hollandite-type complex oxide with Zn and Sn as the main metal elements disposed in the sites B and C. (The sites B and C are equal from the viewpoint of crystal chemistry.) When the main metal element consists of Zn and Sn, its general formula is $A_YZn_XSn_{8-X}O_{16}$.

The X-ray powder diffraction pattern is illustrated in FIG. 2, where the alkaline metal element is potassium, the value of X equals 1.8 and the value of Y equals 3.6.

BRIEF DESCRIPTION OF THE DRAWINGS

The invention will now be described, by way of example, with reference to the drawings, in which.

DETAILED DESCRIPTION OF THE PREFERRED EMBODIMENTS

FIRST EMBODIMENT

The nitrogen oxide absorbing material of the first embodiment is a hollandite-type complex oxide using potassium as an alkaline metal element, containing the main metal elements of Al and Sn, with the values of both X and Y in the general formula being 1.8, and represented by a formula: $K_{1.8}Al_{1.8}Sn_{6.2}O_{16}$.

METHOD OF MANUFACTURING THE FIRST EMBODIMENT

The method of manufacture of the nitrogen oxide absorbing material or the complex oxide of the first embodiment is now explained.

First, dissolve tin tetra-iso-propoxide, $Sn(i-OPr)_4$, in isopropanol, and dissolve aluminum nitrate, $Al(NO_3)_3 \cdot 9H_2O$, and potassium nitrate, $KNO_3$, in distilled water, such that the metal element ratio of K:Al:Sn becomes 1.8:1.8:6.2.

Subsequently, gradually drop the water solution of the aluminum nitrate and the potassium nitrate into the isopropanol solution of the tin tetra-iso-propoxide, such that the tin tetra-iso-propoxide is hydrolyzed. At this stage, a deposit of $Sn(OH)_4$ is produced, while the nitrates of Al and K remained dissolved.

Evaporate the solution containing the deposit to dryness at 100° C. and grind with alumina mortar and pestle, thereby preparing precursors.

Thermally treat the precursors at 800° C. for six hours in air, thereby obtaining a hollandite-type complex oxide of $K_{1.8}Al_{1.8}Sn_{6.2}O_{16}$ of the first embodiment. The specific surface area of the resulting synthetic powder can be measured as large as 32.7 $m^2/g$ in the BET method.

Figure 1:
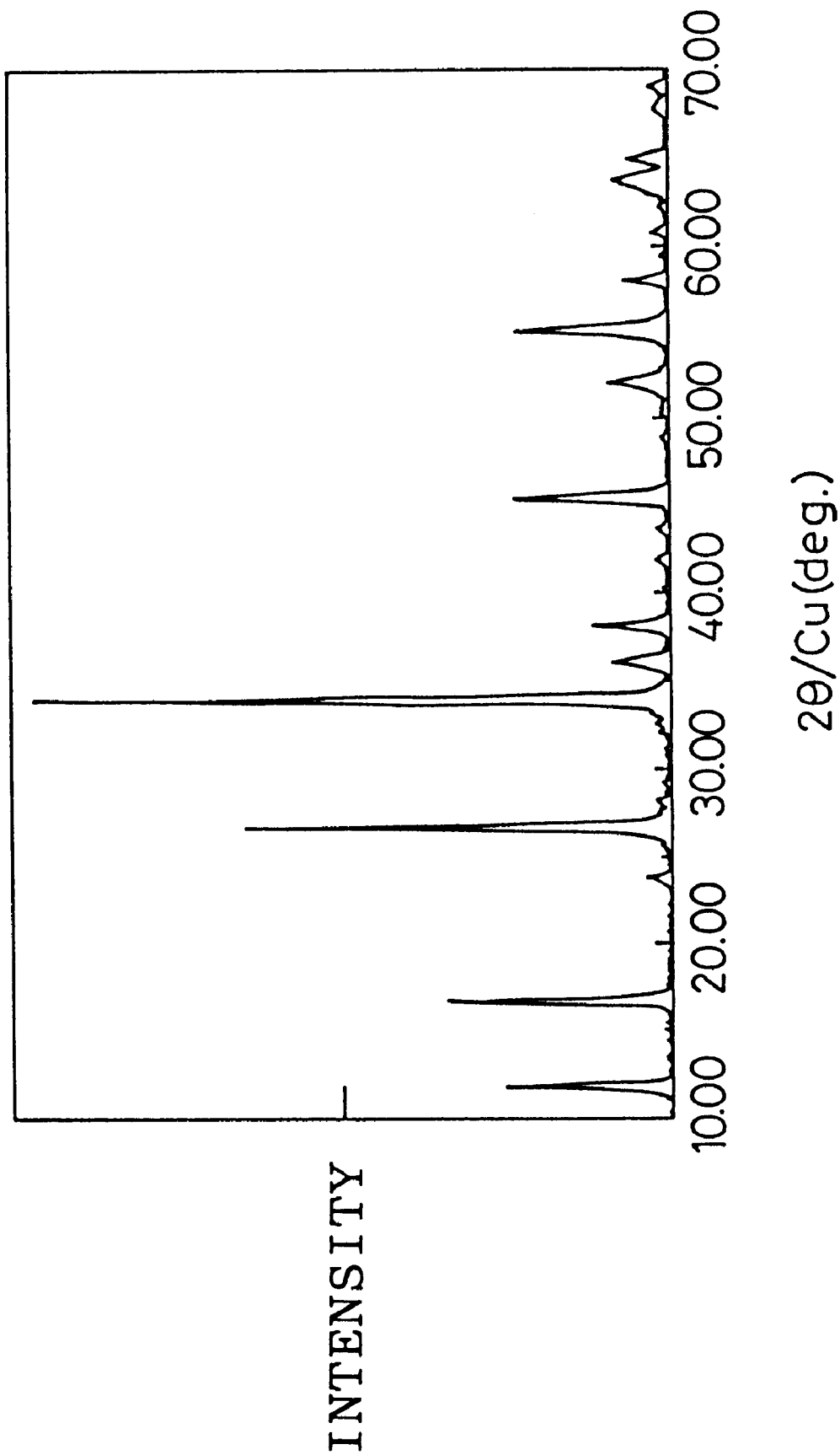
FIG. 1 shows a X-ray powder diffraction pattern according to a first embodiment, represented by a formula, $K_{1.8}Al_{1.8}Sn_{6.2}O_{16}$ (A=K+, X=Y=1.8)

The resulting material is confirmed to be a hollandite-type single phase through the X-ray powder diffraction, as shown in FIG. 1.

It is impossible to confirm the hollandite-type single phase with a microscope or others. Therefore, it is confirmed that the diffraction pattern be identical to the peak pattern of $KTi_8O_{16}$ shown in a JCPDS card (41-1097).

SECOND EMBODIMENT

The nitrogen oxide absorbing material of the second embodiment is a hollandite-type complex oxide using potassium as an alkaline metal element, containing the main metal elements of Zn and Sn, with the values of X and Y in the general formula being 1.8 and 3.6, respectively, and represented by a formula: $K_{3.6}Zn_{1.8}Sn_{6.2}O_{16}$.

METHOD OF MANUFACTURING THE SECOND EMBODIMENT

The nitrogen oxide absorbing material or the complex oxide of the second embodiment is manufactured in the same manner as the first embodiment.

First, dissolve tin tetra-iso-propoxide, $Sn(i-OPr)_4$, in isopropanol, and dissolve zinc nitrate, $Zn(NO_3)_2 \cdot 6H_2O$, and potassium nitrate, $KNO_3$, in distilled water, such that the metal element ratio of K:Zn:Sn becomes 3.6:1.8:6.2.

Subsequently, gradually drop the water solution of the zinc nitrate and the potassium nitrate into the isopropaol solution of the tin tetra-iso-propoxide, such that the tin tetra-iso-propoxide is hydrolyzed. At this stage, a deposit of $Sn(OH)_4$ is produced, while the nitrates of Zn and K remained dissolved.

Evaporate the solution containing the deposit to dryness at 100° C. and grind with alumina mortar and pestle, thereby preparing precursors.

Thermally treat the precursors at 800° C. for six hours in air, thereby obtaining a hollandite-type complex oxide of $K_{3.6}Zn_{1.8}Sn_{6.2}O_{16}$ of the second embodiment. The specific surface area of the resulting synthetic powder can be measured as large as 22.4 m²/g in the BET method.

Figure 2:
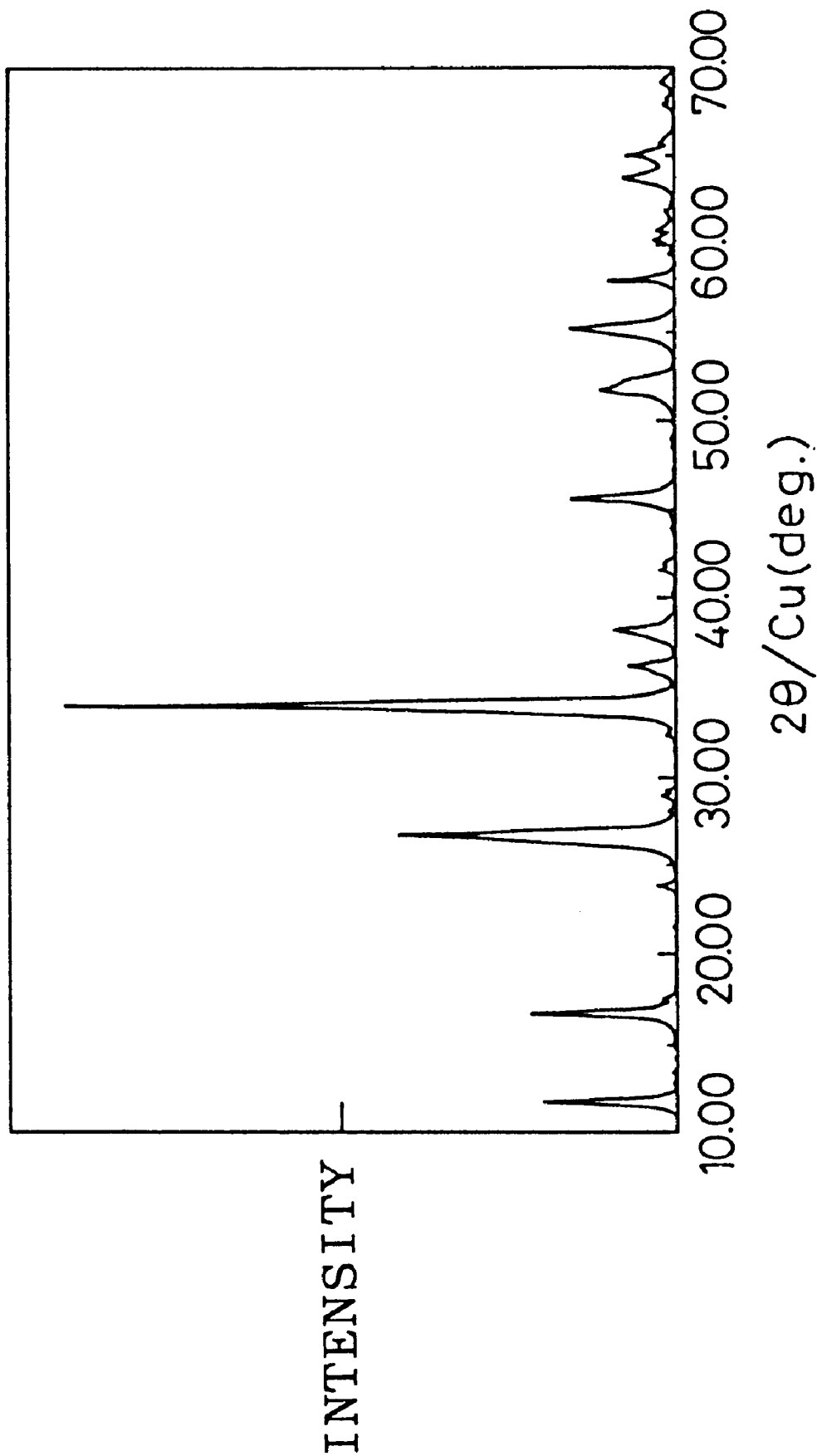
FIG. 2 shows a X-ray powder diffraction pattern according to a second embodiment represented by a formula, $K_{3.6}Zn_{1.8}Sn_{6.2}O_{16}$ (A=K+, X=3.6, Y=1.8)

The resulting material is confirmed, in the same manner as the first embodiment, to be a hollandite single phase through the X-ray powder diffraction, as shown in FIG. 2.

EXPERIMENT

An experiment was conducted to check the effectiveness of the nitrogen oxide absorbing material of either embodiment.

The powder resulting from the aforementioned manufacture method was compacted under the pressure of 200 kg/cm², the compact was ground and sized to 28 to 48-mesh powder, and 2 g of the powder was filled in a reaction tube of Pyrex (tradename). The mixture gas composed of 1000 ppm of NO, 1000 ppm of $CH_4$, 5% of $O_2$ and the remainder of He as a model exhaust gas was passed through the reaction tube at a rate of 50 ml/min.

The composition of the gas exhausted from the reaction tube was evaluated using a chemiluminescense-based $NO_X$ analyser and a gas chromatograph. Specifically, the $NO_X$ concentration of the gas exhausted from the reaction tube was measured using the $NO_X$ analyser every 30 minutes, and the $N_2$ and $N_2O$ concentrations of the gas were measured using the gas chromatography every 30 minutes. The results of measurements of the $NO_X$ concentration are shown in FIG. 3.

Figure 3:
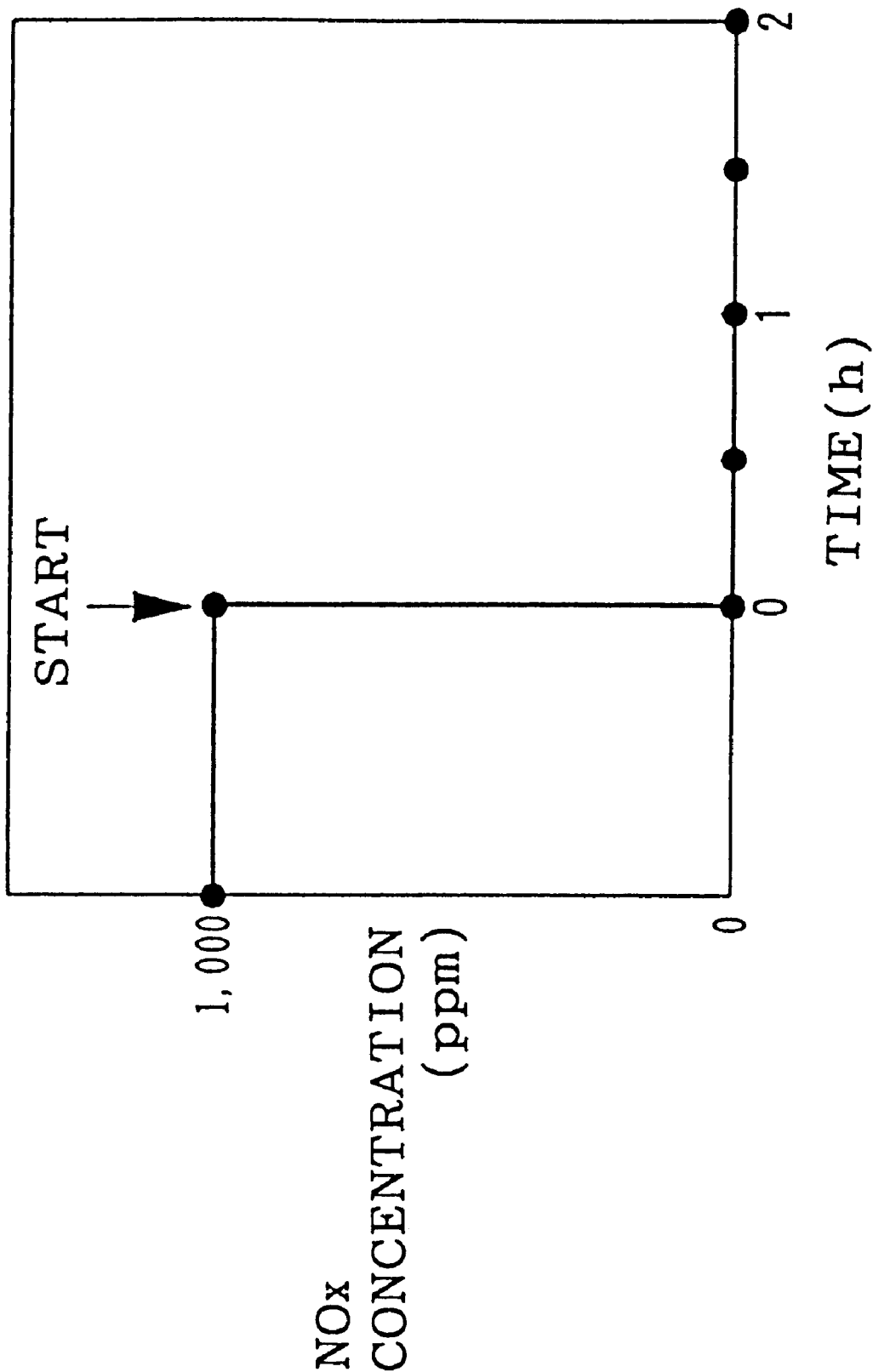
FIG. 3 is a graph showing the nitrogen oxide absorption properties resulting from the experiment of the complex oxides of the first and second embodiments.

As shown in FIG. 3, for two hours when the experiment was conducted at 500° C., no $NO_X$ was detected, and neither $N_2$ nor $N_2O$ was detected with the gas chromatography. Therefore, it is clear that the introduced NO gas was completely absorbed by the complex oxide of either embodiment at the high temperature.

As aforementioned, the nitrogen oxide absorbing material, according to the embodiments, has a large specific surface area and thus has a large absorbing amount. Even at high temperatures, the nitrogen oxide absorbing material can effectively absorb $NO_X$, and is, therefore, preferable for purifying or treating the high temperature exhaust gas from an automotive or other combustion systems.

When the powdered, grained, pelletized or honeycomb-compacted nitrogen oxide absorbing material is filled in the exhaust gas purifier device set along the passage of the exhaust gas, the nitrogen oxides from the exhaust gas emitted from automotive vehicles or others can be effectively absorbed on the material.

As aforementioned, the nitrogen oxide absorbing material consisting of the complex oxide of the present invention provides high nitrogen oxide($NO_X$) absorbing properties, for example, under the condition of high oxygen concentration even at high temperatures. The nitrogen oxide absorbing material is useful for purifying the exhaust gas of a diesel engine, a lean-burn engine or other combustion systems, and is also useful for absorbing and removing the nitrogen oxides emitted into the atmospheric air.

In the device with the complex oxide used therein, the automotive or other exhaust gases can be effectively purified.

This invention has been described above with reference to the preferred embodiment as shown in the figures. Modifications and alterations may become apparent to one skilled in the art upon reading and understanding the specification. Despite the use of the embodiment for illustration purposes, the invention is intended to include all such modifications and alterations within the spirit and scope of the appended claims.

What is claimed is:

1. A nitrogen oxide absorbing material, consisting essentially of a hollandite-type complex oxide having a tunnel structure formed by octahedrons at least comprising aluminum and tin as main metal elements and oxygen.

2. The nitrogen oxide absorbing material according to claim 1, wherein the complex oxide is represented by a formula $A_Y Al_X Sn_{8-X} O_{16}$ wherein the formula element A is selected from at least one of Li, Na, K, Rb, Cs, Ca, Sr and Ba, wherein the ranges of X and Y are respectively $0.5 \leq X \leq 2.5$ and $0 \leq Y \leq X$.

3. A method of making a nitrogen oxide absorbing material comprising the steps of:

a) mixing the starting materials of the elements stated in claim 1 wet chemically; and b) thermally treating the mixture at 600° C. or above.

4. A nitrogen oxide absorbing material, consisting essentially of a hollandite-type complex oxide having a tunnel structure formed by octahedrons at least comprising zinc and tin as main metal elements and oxygen.

5. The nitrogen oxide absorbing material according to claim 4, wherein the complex oxide is represented by a formula $A_Y Zn_X Sn_{8-X} O_{16}$, wherein the formula element A is selected from at least one of Li, Na, K, Rb, Cs, Ca, Sr and Ba, wherein the ranges of X and Y are respectively $0.5 \leq X \leq 2.5$ and $0 \leq Y \leq X$.

6. A method of making a nitrogen oxide absorbing material comprising the steps of:

(a) mixing the starting materials of the elements stated in claim 4 wet chemically and physically; and (b) thermally treating the mixture at 600° C. or above.

7. A method of making a nitrogen oxide absorbing material comprising the steps of:

(a) mixing the starting materials of the elements stated in claim 5 wet chemically and physically; and (b) thermally treating the mixture at 600° C. or above.

* * * * *